(12) United States Patent
Khan et al.

(10) Patent No.: US 7,152,108 B1
(45) Date of Patent: Dec. 19, 2006

(54) DATA TRANSFER SYSTEM AND METHOD WITH SECURE MAPPING OF LOCAL SYSTEM ACCESS RIGHTS TO GLOBAL IDENTITIES

(75) Inventors: Winston Khan, Westport (CA); Ken Bowler, Manotick (CA); Ian Hamilton, Ottawa (CA)

(73) Assignee: Signiant Inc., Burlington, MA (US)

( * ) Notice: Subject to any disclaimer, the term of this patent is extended or adjusted under 35 U.S.C. 154(b) by 873 days.

(21) Appl. No.: 10/231,181

(22) Filed: Aug. 30, 2002

(51) Int. Cl.
*G06F 15/173* (2006.01)

(52) U.S. Cl. ...................................... 709/225; 709/229

(58) Field of Classification Search ................ 709/225, 709/203, 229; 713/168, 200; 705/27; 340/5.74
See application file for complete search history.

(56) References Cited

U.S. PATENT DOCUMENTS

| | | | |
|---|---|---|---|
| 5,319,644 A | 6/1994 | Liang | 370/85.5 |
| 5,519,863 A | 5/1996 | Allen et al. | 395/650 |
| 5,552,776 A * | 9/1996 | Wade et al. | 340/5.74 |
| 5,796,966 A | 8/1998 | Simcoe et al. | 395/311 |
| 6,006,019 A | 12/1999 | Takei | 395/200.54 |
| 6,064,656 A | 5/2000 | Angal et al. | 370/254 |
| 6,163,543 A | 12/2000 | Chin et al. | 370/400 |
| 6,163,809 A | 12/2000 | Buckley | 709/237 |
| 6,199,109 B1 | 3/2001 | Reder et al. | 709/224 |
| 6,219,706 B1 | 4/2001 | Fan et al. | 709/225 |
| 6,298,061 B1 | 10/2001 | Chin et al. | 370/400 |
| 6,396,511 B1 | 5/2002 | Karino | 345/744 |
| 6,557,122 B1 | 4/2003 | Sugauchi et al. | 714/57 |
| 6,600,812 B1 | 7/2003 | Gentillin et al. | 379/45 |
| 6,763,384 B1 | 7/2004 | Gupta et al. | 709/224 |
| 6,823,373 B1 | 11/2004 | Pancha et al. | 709/219 |
| 2002/0032769 A1 | 3/2002 | Barkai et al. | 709/224 |
| 2002/0049834 A1 | 4/2002 | Molnar | 709/219 |
| 2002/0099729 A1 | 7/2002 | Chandrasekaran et al. | 707/203 |
| 2002/0104008 A1 * | 8/2002 | Cochran et al. | 713/200 |
| 2002/0116485 A1 | 8/2002 | Black et al. | 709/223 |
| 2002/0116616 A1 * | 8/2002 | Mi et al. | 713/168 |
| 2002/0165961 A1 | 11/2002 | Everdell et al. | 709/225 |
| 2002/0169694 A1 * | 11/2002 | Stone et al. | 705/27 |
| 2003/0014482 A1 * | 1/2003 | Toyota et al. | 709/203 |
| 2003/0028498 A1 | 2/2003 | Pallante | 705/78 |
| 2003/0046103 A1 | 3/2003 | Amato et al. | 705/1 |
| 2003/0051026 A1 | 3/2003 | Carter et al. | 709/224 |
| 2003/0056096 A1 * | 3/2003 | Albert et al. | 713/168 |
| 2003/0065950 A1 | 4/2003 | Yarborough | 713/201 |
| 2003/0120822 A1 | 6/2003 | Langrind et al. | 709/251 |
| 2003/0126195 A1 | 7/2003 | Reynolds et al. | 709/203 |
| 2003/0212806 A1 * | 11/2003 | Mowers et al. | 709/229 |
| 2003/0216958 A1 | 11/2003 | Register et al. | 705/14 |

\* cited by examiner

*Primary Examiner*—Le Hien Luu
(74) *Attorney, Agent, or Firm*—Pillsbury Winthrop Shaw Pittman, LLP

(57) ABSTRACT

The present invention relates to a method and apparatus for providing security using an authorization process in connection with data transfers. Keyed certificates are used to authenticate remote computers. An authorization table maps remote computers to allowable local users and corresponding qualifiers. In order to complete a data transfer process, the system of the present invention authenticates the remote computer, determines its authority to act as a designated local user, and determines whether the remote computer, acting as the designated local user, can perform the actions required for the data transfer.

24 Claims, 6 Drawing Sheets

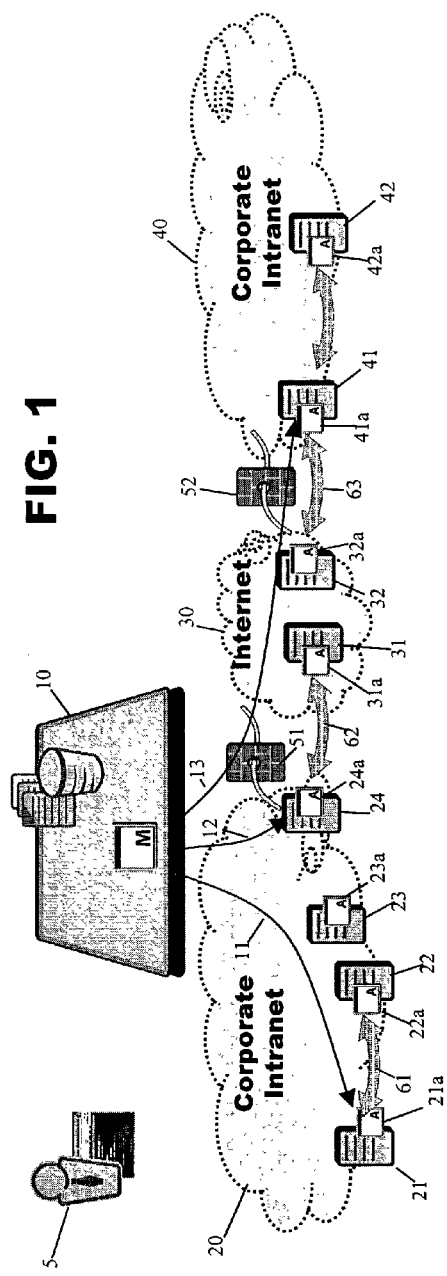
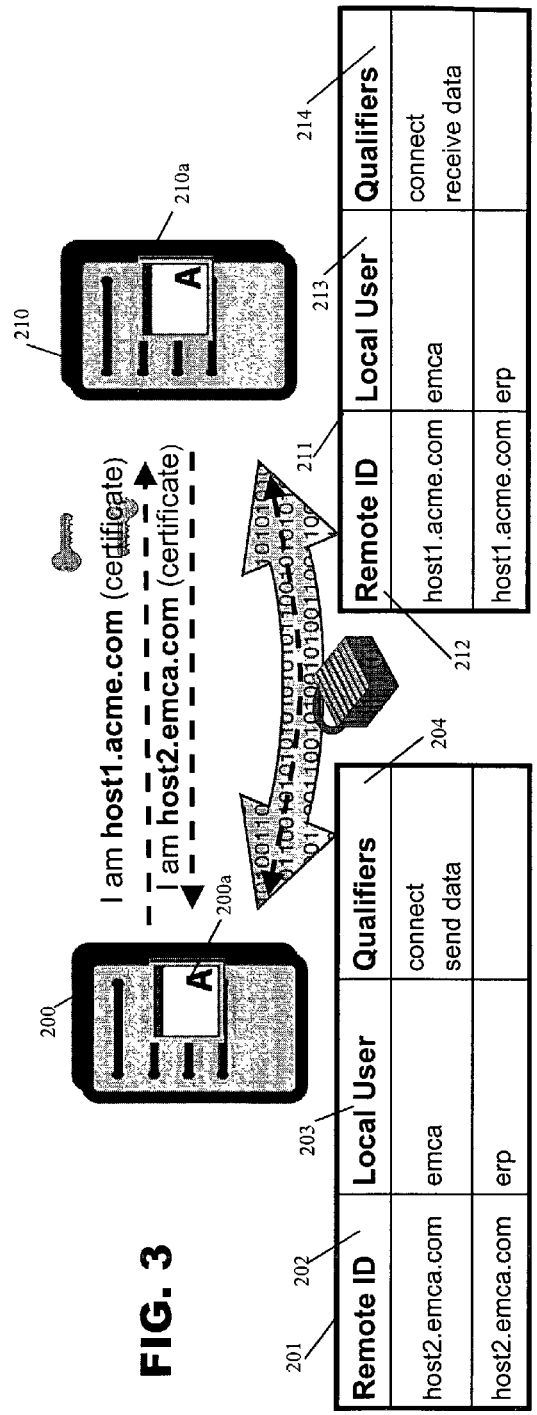
FIG. 1
FIG. 3

DATA TRANSFER SYSTEM AND METHOD WITH SECURE MAPPING OF LOCAL SYSTEM ACCESS RIGHTS TO GLOBAL IDENTITIES

FIELD OF THE INVENTION

The invention relates to a system and method for implementing security procedures during data transfers including the use of an authorization table associating a remote computer to a local user and authorized actions. The invention further enables securely mapping a plurality of unique identifiers for a plurality of remote communicating entities into local system identifiers that control access rights on a local communicating entity where local access rights and remote entity specifications are further qualified by the direction of the connection request.

BACKGROUND OF THE INVENTION

For years, a company's success depended on its ability to receive, manufacture, and ship physical goods. However, as the industrial economy gave way to the information economy, the game changed. Over the past several decades, the use of electronic communications by individuals and companies has exploded. There is a great need for companies to share electronic information, within a company, between companies and with the public. Furthermore, product ordering, and even delivery for digital products, is now regularly performed electronically. However, the increase in electronic communications and commerce has also created numerous problems of reliability, security, and coordination. These problems are not adequately address by existing mechanisms for transferring electronic information.

In the 21st century, business success no longer hinges on the movement of physical goods, but on the exchange of data: a company's ability to produce, add value to, and derive value from data is crucial to its success. Regardless of whether data is satellite imagery, software source, seismic exploration results, reinsurance documentation or any other form of electronic information, data is critical to modern businesses. Furthermore, enterprises need to collaborate with suppliers, partners and customers, while doing so with fewer fixed costs and less capital. To be successful, enterprises must efficiently move data without stumbling on system, geographic or corporate boundaries. The expansion of information transfers and cost reduction pressures have impeded the ability of companies to properly handle electronic information.

Often the process of exchanging data relies on homegrown tools for information transfer. Many companies expend substantial effort scripting data transfers that use the File Transfer Protocol (FTP), rather than applying resources to revenue generating activities. Automating just one simple process can take many person-months of effort.

Many organizations attempt to secure electronic transfer over public Internet Protocol-based networks using Virtual Private Networks (VPNs). However, VPNs offer nothing in terms of process automation and application integration and require compatible VPN implementations at either end of the connection. It is unrealistic to expect all suppliers, vendors, customers, trading partners, or collaborators to implement company specific VPNs in order to communicate.

Extensive mergers and acquisitions have also changed the state of today's enterprise and the need for information sharing. This trend is prevalent in the high-tech sector, where established players are acquiring or merging with smaller companies in niche markets. This growth increases the necessity to have a reliable means of sharing data between two companies that need to operate as one. Companies are often relying on physical media and homegrown systems to transfer business critical data from one work site to another. With a merger or acquisition, companies are faced with the troubling task of needing to distribute physical media to more people or linking new users who are operating on disparate systems into their homegrown data transfer solution.

As the challenge of transferring data with their customers, partners and suppliers swells for organizations, there is a growing need for different solutions for different "classes" of business data. Much like the postal service deals with letters and packages of varying shapes and sizes, so does data transfer. For example, data that must be distributed to many people around the world is best delivered using a browser-based Internet download solution. On the other hand, critical corporate data that requires process automation and high levels of security is best distributed using an automated data distribution model.

Existing systems and processes for communicating or transferring electronic data have great deficiencies in meeting many needs of today's businesses. In particular, existing solutions lack the ability to address automated, event-driven, system-to-system data distribution requirements. They also lack the ability to provide proper security with ease of use and wide distribution. Furthermore, they are not easily scalable or interoperable. Therefore, a need exists for a system that automates secure system-to-system data distribution amongst a large number of sources and targets over any network.

SUMMARY OF THE INVENTION

The deficiencies of the prior art are substantially overcome by the system of the present invention which includes a system having at least two computers or other terminal devices between which data is transferable, a central manager, a set of data distribution rules and distribution agents associated with each of the computers or terminal devices. The data distribution rules are stored in the central manager and include information necessary for the proper transfer of data from one location to at least one second location. For example, the data distribution rules may include file source and destination information, file formatting information, tasks to be executed before or after transfers, dependencies between transfers, firewall traversal information, and encryption information. The distribution rules are communicated to the distribution agents which process the rules to carry out the data transfer. Distribution agents may operate independently or in combination. As an alternative to including all of the transfer information in the distribution rule, appropriate information may be included in a distribution agent. The distribution agents are responsive to receipt of specific information to perform their individually designated process. Therefore, upon receipt of a distribution rule from the central manager, either through a direct connection or a connection through another distribution agent, a distribution agent can respond by retrieving the desired file or files, properly formatting them, transferring the files to the designated recipient and performing other functions including local command execution. Upon receipt of instructions and data, another distribution agent appropriately receives the data, including any necessary decryption, stores the data file according to its defined rules, and performs other functions, including local command execution. The central manager can also coordinate multiple data transfers, remote command executions, and manage dependencies between them including serial and conditional execution. Two-way communication links between the central manager and one of the distribution agents or between distribution agents preferably are maintained during a transfer process. These communication links may be through one or more local area networks, wide area networks, proprietary networks, global networks or other networks, including wired, wireless or a combination of wired and wireless networks.

According to another aspect of the invention, the system provides security in a data transfer process by using an authorization table associated with the distribution agent for mapping a remote computer to authorized local user designations and qualifiers or limitations for the authorization. Upon receiving a distribution rule, which includes a desired local user designation and a desired action, from a remote computer, the distribution agent performs the desired action as the desired user based upon the authorization table.

According to one embodiment, the system includes using a keyed certificate from a remote computer and processing the keyed certificate to verify the remote computer. According to one embodiment, the remote computer may be authorized to function as a designated local user based upon the authorization table.

According to another aspect of the invention, the authentication and authorization process utilizes a set of certified remote identifiers to authenticate a communication link between computers and corresponding local identifiers to determine authorization for each action requested on the local computer by the remote computer. Certificates provided by the central manager are used to authenticate each remote identifier. According to another aspect of the invention, in the authorization process, each remote computer requests permission to act pursuant to a specific local identifier. Following an authorization check, if the remote computer is authorized to act under the local identifier, an association is made between the remote identifier and the local identifier. When communication links are established or distribution rules are executed, the qualifications are checked to determine authorization of the remote computer, acting under the local identified, to perform the desired actions.

BRIEF DESCRIPTION OF THE DRAWINGS

FIG. 1 illustrates a data transfer system according to an embodiment of the present invention.

FIG. 3 illustrates an authorization system according to an embodiment of the present invention.

DETAILED DESCRIPTION

Figure 2A:
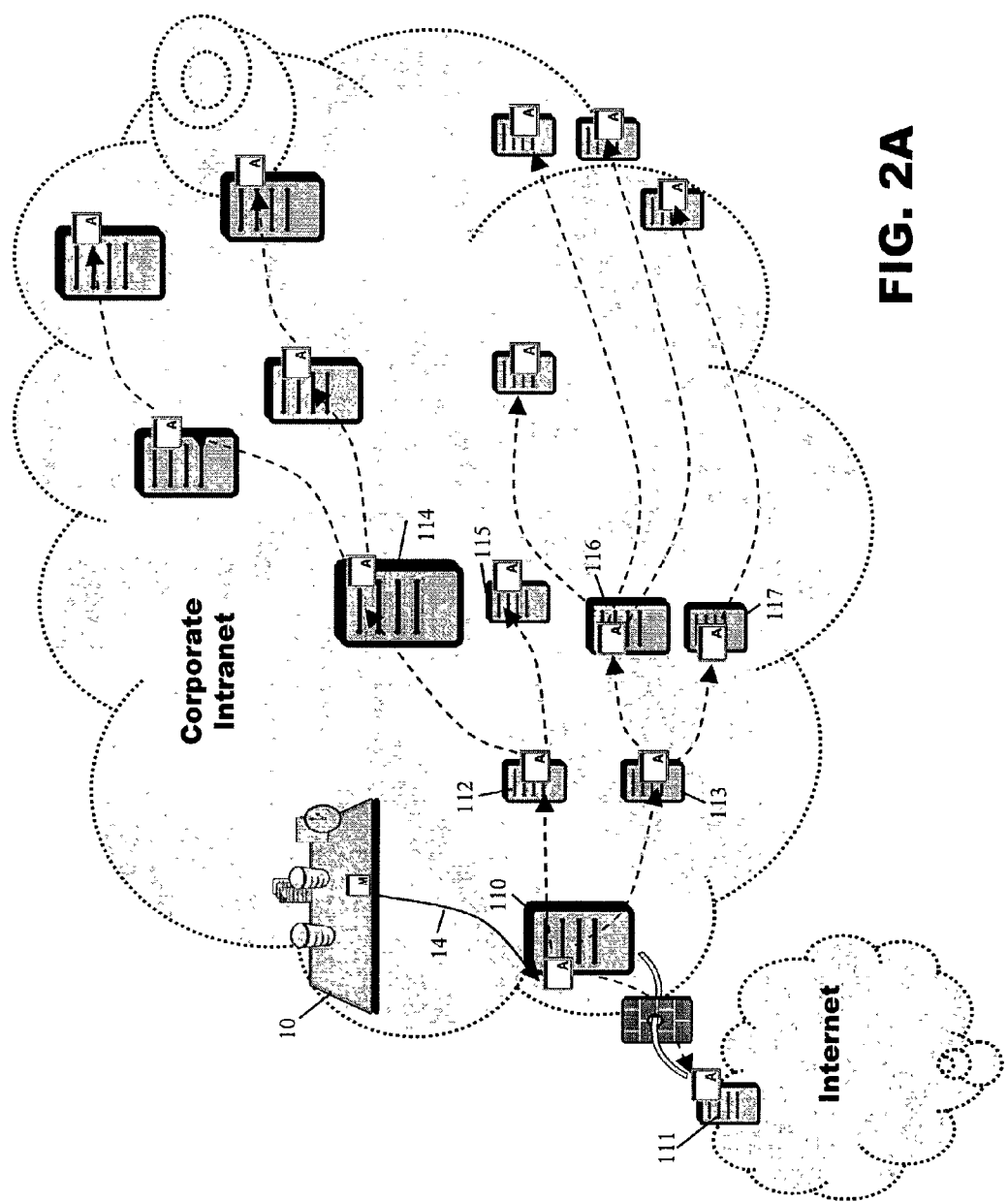
FIGS. 2a–2e illustrate operation of distribution rules and distribution agents within a data transfer system according to an embodiment of the present invention.

The present invention provides a distributed system for efficient and adaptable data transfer and control. FIG. 1 illustrates a data transfer system 1 in accordance with an embodiment of the present invention. The data transfer system 1 is formed of a plurality of computers 10, 21, 22, 23, 24, 31, 32, 41, 42. These computers may be of any currently known types, including personal computers, minicomputers, mainframes, servers, etc. Furthermore, the present invention is not limited to computers. The transfer processes of the present invention can be used with any device to or from which data may be transferred, including, in addition to computers, PDAs, MP3 players, cellular telephones, etc. The following description of the system of the present invention uses the term computers for ease of reference. The exact nature of the computers used is not important to the data transfer system 1. The key feature of such computers is the ability to communicate to other computers in order to carry out the operations of the present invention as described below. The computers can communicate in any known manner, including through wired or wireless local area networks, wide area networks, global area networks, peer-to-peer connections, or other communications links. As illustrated in FIG. 1, different types of networks can be utilized depending upon the desired source and destination of any data transfers. FIG. 1 illustrates computers networked in two separate corporate intranets 20, 40 which are joined by the Internet 30. Firewalls 51, 52 are disposed in the connections between the intranets 20, 40 and the Internet 30. Of course, any other configurations are possible for the present invention.

As illustrated in FIG. 1, the data transfer system 1, includes a central management computer 10 and a plurality of distribution agents 21a, 22a, 23a, 24a, 31a, 32a, 41a, 42a, each associated with one of the computers in the data transfer system 1. A distribution agent is a piece of software which resides on a local computer. The distribution agent responds to communications from the central management computer 10, or any of the other computers, to perform programmed steps in a data transfer. The central management computer 10 stores a set of distribution rules. Each rule corresponds to a particular data transfer process to be performed.

Operation of the data transfer system 1 will now be described. Based upon a set timing, upon the occurrence of a specified condition or at other times, the central management computer 10 establishes a communication link 11 to one of the computers 21 in the data transfer system 1. The timing can be based on various given factors. Generally, the timing of data transfers are based either on a schedule or upon occurrence of an event. Schedules are used for transfers to occur at specified times. Schedules may be set to accommodate other uses of resources, such as making data transfers outside of regular working hours. Events can also be used to trigger a transfer which is dependent upon the event, but not on a particular timetable. Alternatively, the timing can be based upon a specified event. For example, a request for a transfer can be sent to the central management computer. Upon receipt of a request, an appropriate communications link can be created by the central manager to provide the transfer.

Once a communication link 11 is established, a distribution rule is transferred from the central manager to the connected computer 21. A distribution rule includes a set of steps for execution by the agent 21a on the connected computer 21 necessary to complete the desired data transfer. Such steps may include retrieval of the specified data from a source connected to the computer 21, encryption of the data, formatting of the data, conversion of the data to a different format, firewall traversal processes, or any other process necessary to properly transfer data. Additionally, the distribution rule may include steps to be performed upon reception of the data, such as decryption, change in formatting, and storage of the data at the recipient computer. The distribution rule may also reference scripts to be performed before, after or during execution of steps in the data transfer. Thus, for example, information from a database can be extracted prior to a transfer.

Upon receipt of the distribution rule, the agent 21a performs the steps in the rule. In order to transfer data, a communication link 61 is opened between the source computer 21 and a recipient computer 22. The exact nature of the communication link 61 depends upon the specific types and operations of the source computer 21 and the recipient computer 22. The nature of the communication link 61 and the process for establishing it may be included in the distribution rule. Alternatively, these processes may be implemented by the agents 21a, 22a on each of the computers. Once a communication link 61 is established, the agent 21a performs the steps identified by the distribution rule to transfer the data.

As illustrated in FIG. 1, data transfers may occur within a single network or across networks. The data transfer system 1 is indifferent to the network structures. The processes for making transfers between networks are included in the distribution rules stored on the central management computer 10. The procedure for transferring data between networks is essentially the same as for transfers within a network. The central management computer 10 opens a communication link 12 with a source computer 24 and transmits the appropriate data distribution rule. The source computer 24, pursuant the scripts in the data distribution rule, establishes a communications link 62 with a recipient computer 31. When a data transfer crosses networks, the data distribution rule may include information about traversing the firewall 51, if any, between the networks.

The above examples illustrate the central management computer 10 establishing a communications link with source computers 21, 24 for moving data from the source computer 21, 24 to recipient computers 22, 31. However, nothing in the present invention limits operation to a "push" transfer. As illustrated in FIG. 1, the communications links 61, 62 used in making the transfers are bi-directional. Data could just as easily be transferred from computer 22 to computer 21 over communication link 61 as the other way around. Thus, the central management computer 10 may open a communication link with computer 21 with a distribution rule requesting a transfer to computer 21 from another computer. Computer 21 would then establish a communication link 61 with another computer 22 having the desired data. Using the communication link, computer 21 requests that computer 22 transfer the appropriate data over the communication link. For ease of discussion, operation of the system is described herein as transferring data from a controlling computer 21, i.e. the computer receiving a distribution rule first, to the non-controlling computer 22, i.e. the computer receiving the distribution rule from the controlling computer. However, communication of the distribution rule, from the central manager or any other computer, is independent of the direction of data transfer.

Finally, the data transfer system 1 includes a management interface 5 connected to the central management computer 10 for establishing the distribution rules and installing the agents. The management interface 5 includes appropriate authentication procedures, such as user identification and passwords to prevent unauthorized changes to the central management computer 10. An appropriate user interface is implemented on the management interface 5 in order to develop and install distribution rules. The management interface 5 is also used to set or modify the schedules for execution of distribution rules. Furthermore, the management interface 5 does not have to be a single purpose unit. Rather, it may be any computer which can connect to the central management computer 10. The authorization process may also limit a specific user to creation or modification of only some distribution rules. In this manner, different entities may modify rules applicable to those entities. The distribution agents on each of the computers may also be installed by the central management computer 10 through use of the management interface 5. Various authorization and security procedures can be used to control the installation or modification of distribution agents.

Since the data transfer process is defined by distribution rules, the data transfer system 1 of the present invention can easily accommodate different data transfer types to meet virtually any need. FIGS. 2a–2e illustrate different possible scenarios for data transfer.

FIG. 2a illustrates a fan out process for distributing copies of the same data to a plurality of computers within or outside of a company. As illustrated in FIG. 2a, the central management computer 10 does not have to be a separate, stand-alone computer, but can be a part of a corporate intranet. Furthermore, more than one central management computer 10 can be used to store distribution rules for different companies or for a single company. In the fan out process of FIG. 2a, the central management computer 10 establishes a communication link 14 with a primary source computer 110. The distribution rule transferred over the communication link 14 includes information about distribution of selected data to various computers. According to the distribution rule, the primary source computer 110 transfers the data to three secondary computers 111, 112, 113. One of the secondary computers 111 is located outside of the corporate intranet and two of the secondary computers 112, 113 are within the intranet. The processes for transferring the data to each of the secondary computers 111, 112, 113 are part of the distribution rules and are not necessarily the same. For example, the transfer to secondary computer 111 may include firewall processes, which are not part of the internal transfers. The agents 112a, 113a on the secondary computers 112, 113 also operate on the distribution rule to further transfer the data to additional computers 114, 115, 116, 117. In this manner, the distribution rule controls data transfer paths and optimizes the transfer process. The primary source computer 110 does not have to make separate transfers to all of the computers to receive the data. Since each recipient computer includes a distribution agent, subsequent distributions are possible from the recipient. Thus, an entire, complicated transfer process can be included as part of a distribution rule, which is distributedly executed by the distribution agents on the various computers.

Figure 2B:
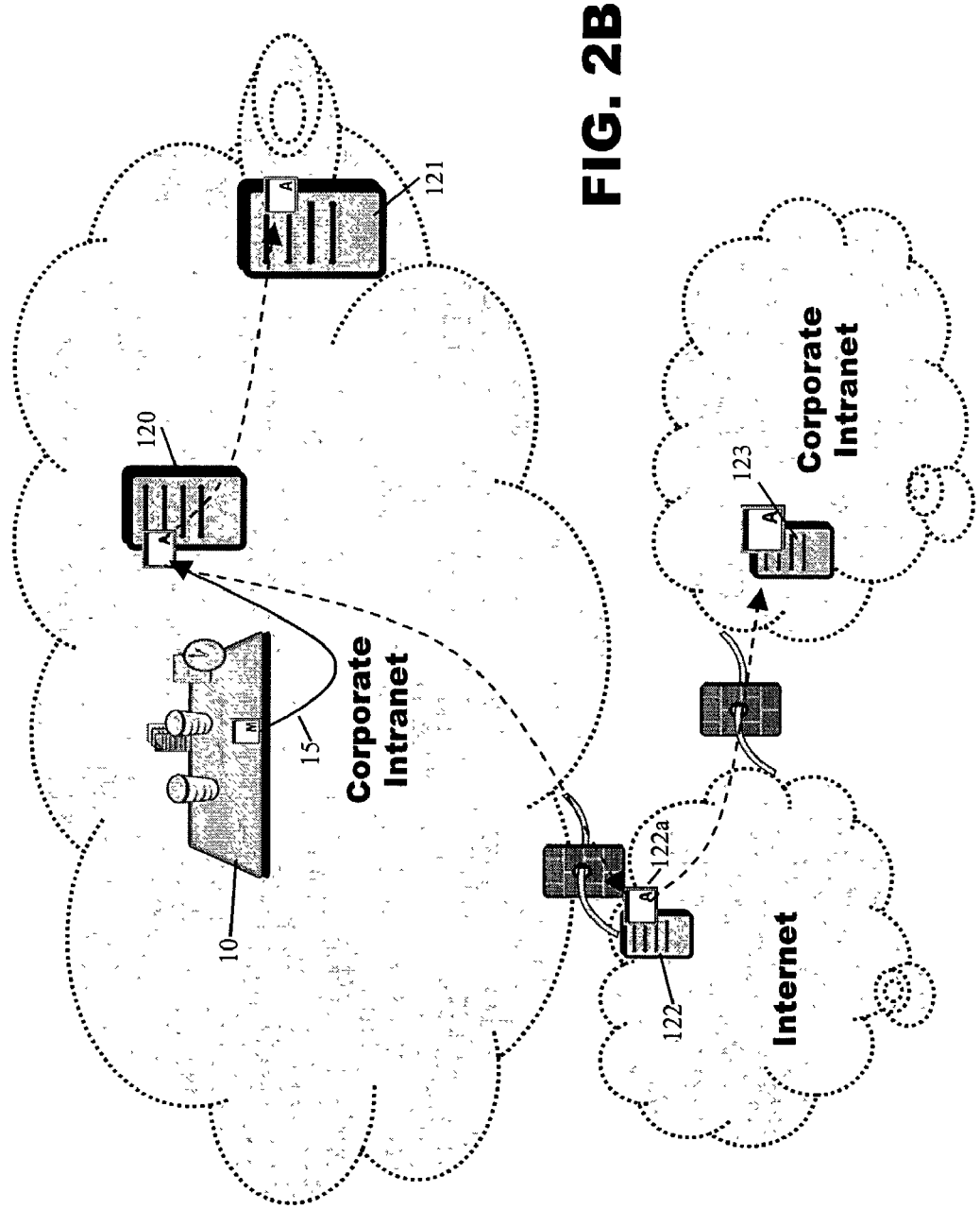

FIG. 2b illustrates a replication process. The central management computer 10 establishes a communication link 15 with a primary source computer 120 and transmits the distribution rule. The primary computer then transfers the appropriate data to computers 121, 122 both within and outside the intranet. The distribution agent 122a on the computer 122 in the internet further processes the distribution rule to transfer the data to computer 123 on another intranet.

Figure 2C:
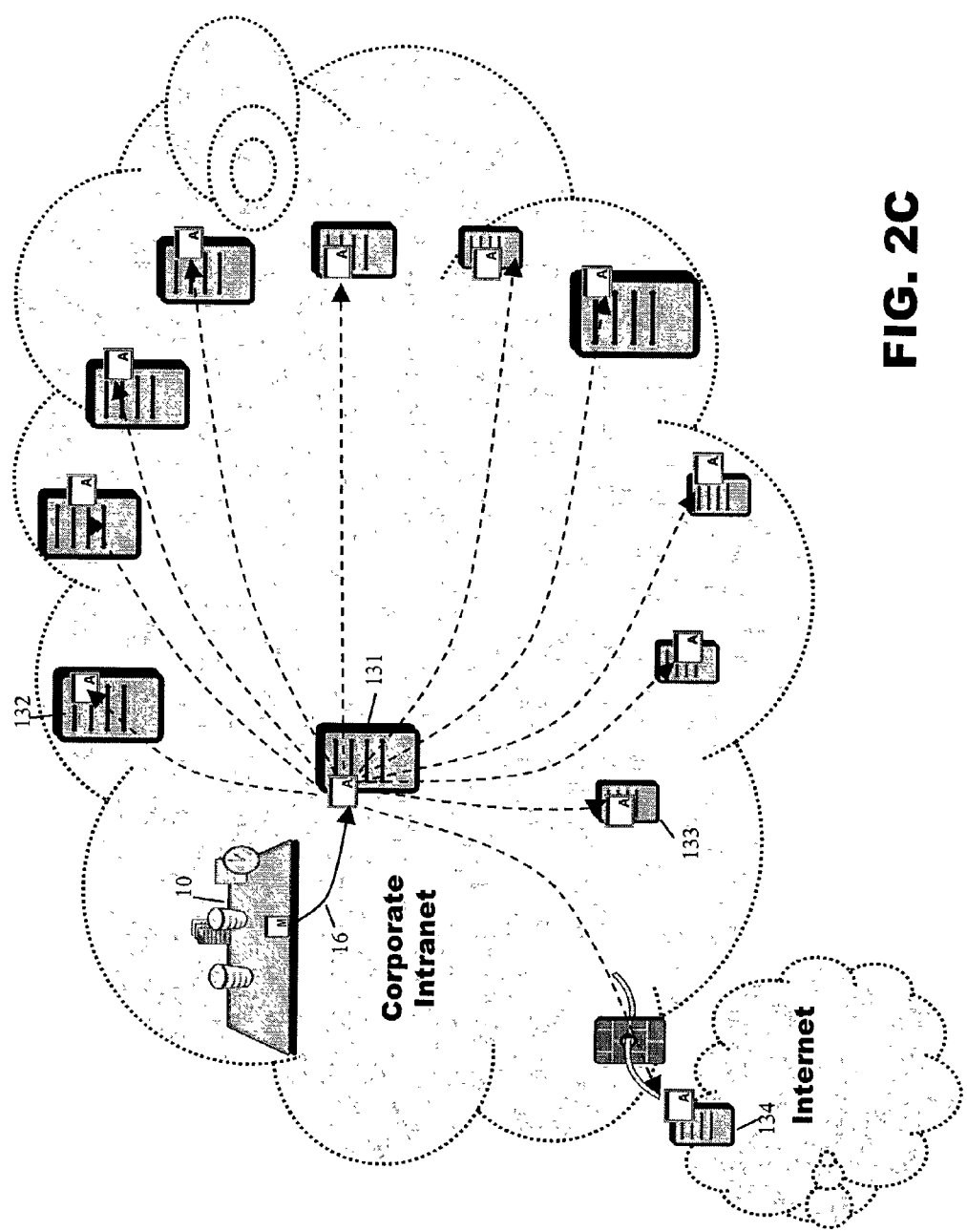

FIG. 2c illustrates a multiple copy replication process. Upon receipt of a distribution rule from the central management computer 10, the primary source computer 131 transfers the data to a plurality of computers 132, 133, 134. While the fan out process of FIG. 2a also transfers data to multiple computers, the procedure is different from the replication process in FIG. 2c since the primary source computer 131 makes all of the transfers in the process of FIG. 2c.

Figure 2D:
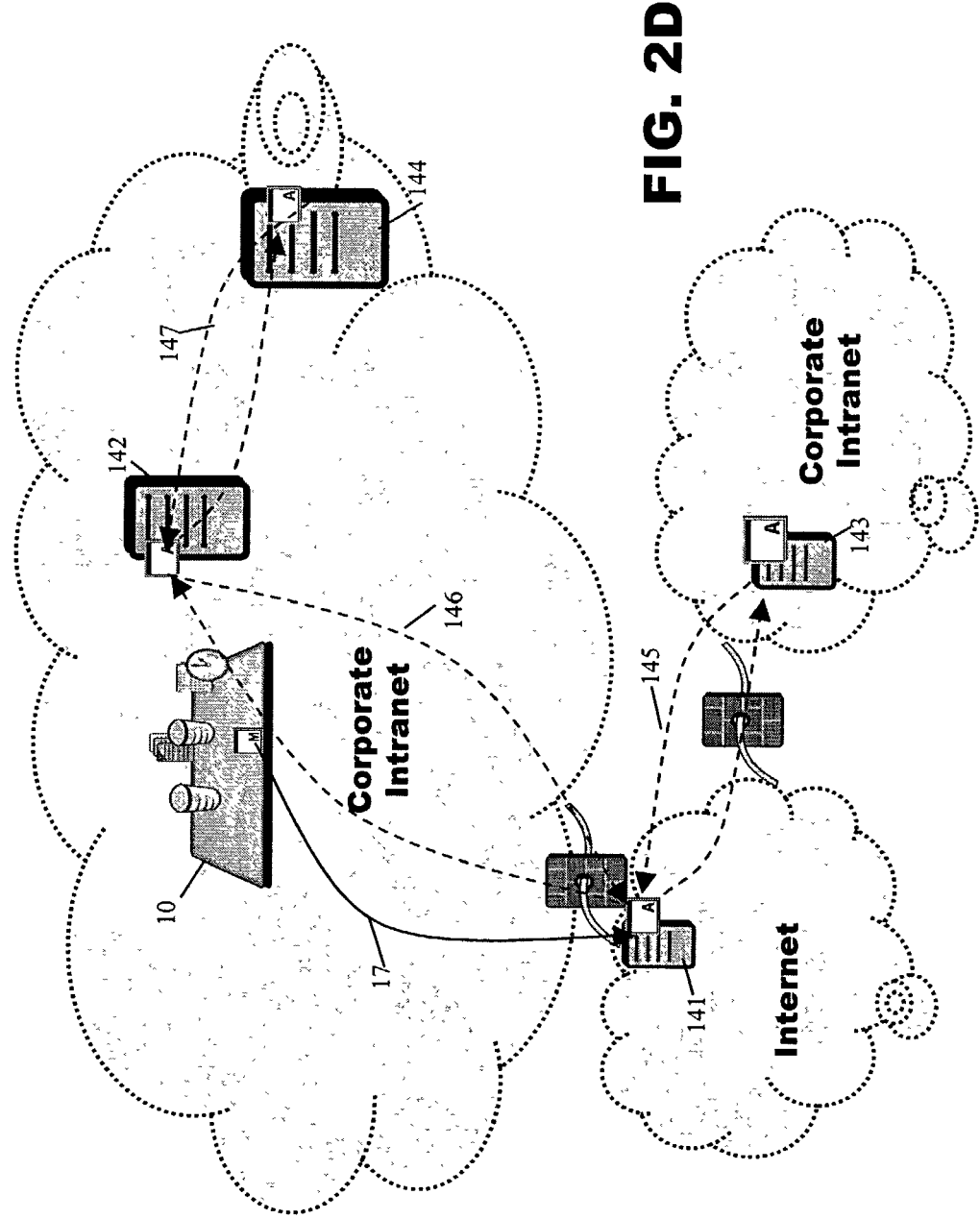

FIG. 2d illustrates a synchronization process. Since the steps for processing the data prior to transfer or upon receipt are included in the distribution rule, complex processes can be implemented. In the illustration of FIG. 2d, a primary computer 141 is used to synchronize data on several different computers 142, 143, 144 which are included within different networks. The central management computer 10 transmits 17 the distribution rule to the primary computer 141. The primary computer then establishes two-way communication links 145, 146 to secondary computers. The two-way communications links 145, 146 are used to synchronize data in the secondary computers 142, 143 and the primary computer 141. Furthermore, the distribution agent in secondary computer 142 establishes a two-way communication link 147 with another computer 144. This two-way communication link 147 is used to synchronize the data with this other computer 144. In this manner, complex synchronization can be implemented using simple distribution rules.

Figure 2E:
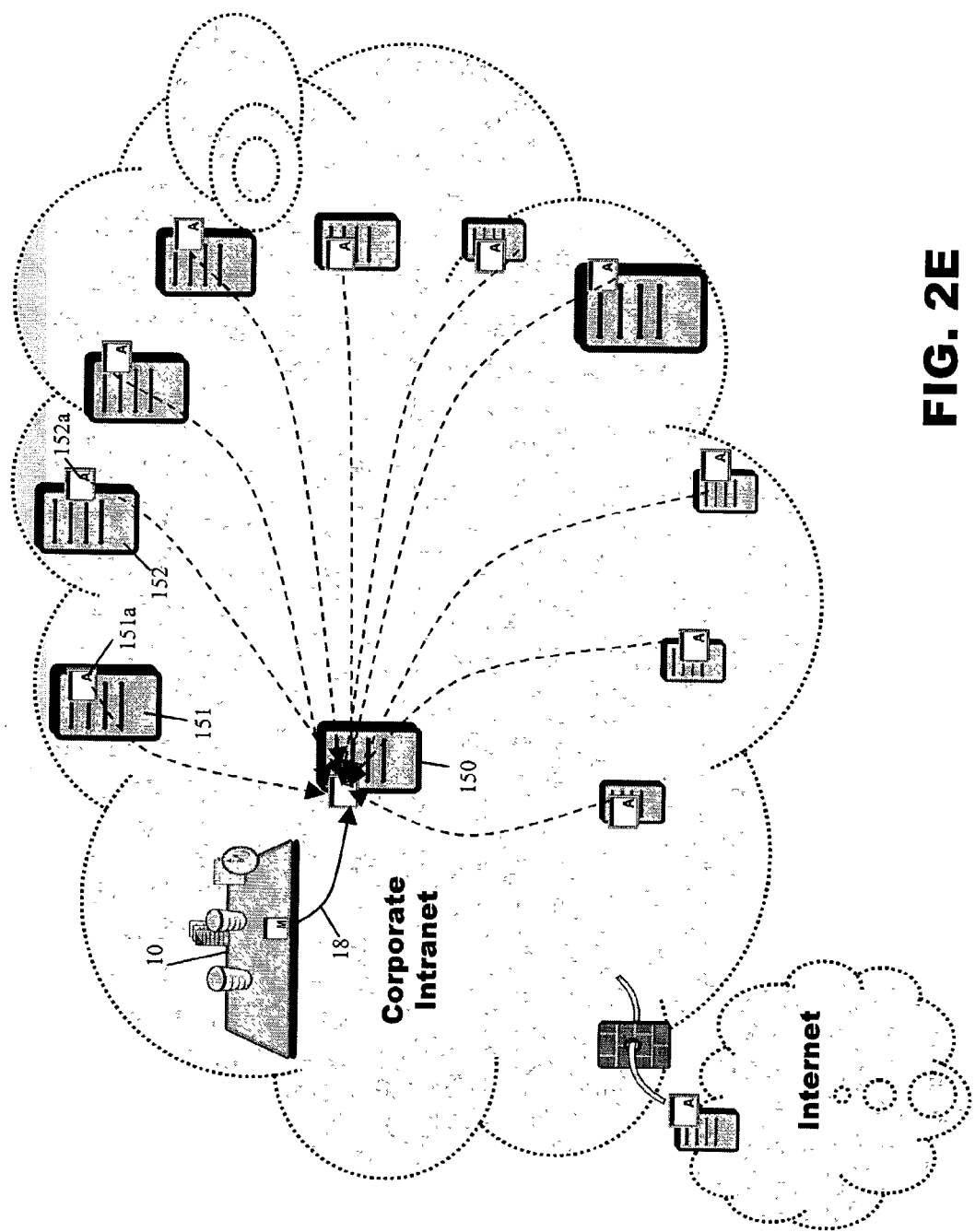

FIG. 2e illustrates an aggregation process. The central management computer 10 transmits a distribution rule to a primary computer 150. The primary computer 150 establishes communication links 161, 162 with a plurality of computers 151, 152. The distribution agents 151a, 152a on each of the plurality of computers responds to the distribution rule from the primary computer 150 by transferring data to the primary computer 150. In this manner, the primary computer receives and aggregates the data from the plurality of computers 151, 152.

FIGS. 2a–2e are merely illustrative of different processes which can be implemented using the data transfer system of the present invention. Other possible transfer processes may also be implemented by setting up appropriate data distribution rules.

FIG. 3 illustrates a security system according to an embodiment of the present invention. The security process of the present invention controls authorization for data transfer processes within the data transfer system 1. The security process of the present invention utilizes multiple steps and security authorization processes. FIG. 3 illustrates two computers 200, 210 involved in a data transfer, each with a distribution agent 200a, 210a for controlling the process. While FIG. 3 illustrates a data transfer process, the same procedure may also be used for all communication processes within the data transfer system of the present invention, including communication of distribution rules from the central management computer to any other computer.

To establish a communication link, computer 200 initiating a data transfer process, determines if a connection to the receiving computer 210 is allowed using authorization table 201. The authorization table 201 may be part of the computer 200 or may be on another trusted computer on a network accessible by computer 200. Preferably, the authorization table is accompanied by a digital signature computed on the authorization table by the distribution agent 200a of the initiating computer 200. If the authorization table is not properly signed, then the distribution rule is not executed or data transfer is not completed. In this manner, the distribution agent 200a maintains the security of the authorization table.

The authorization table 201 includes three parts 202, 203, 204 for mapping local user identifiers to authenticated remote computers. The first part 202 identifies a remote computer; the second part 203 identifies a corresponding local user; and the third part 204 provides qualifiers for operation of the system. When an initiating computer 200 establishes a communication link with the receiving computer 210, it requests authorization to connect to the receiving computer while operating under a local user identifier on the initiating computer. The distribution agent 200a consults the authorization table 201 to determine whether the remote computer is associated with the local user in the table. If the remote computer is not associated with the requested local user, then the communication link is not initiated.

If the remote computer is associated with the requested local user, and the qualifier 203 allows outbound connections, the communications link is initiated. The first step of the communications link setup involves the use of keyed certificates. To establish a communication link, a computer 200 initiating a data transfer process sends a keyed certificate, for example, using a SSL connection or in another suitable manner. The receiving computer 210 authenticates the computer 200 using the keyed certificate. If the receiving computer 210 is not able to authenticate the initiating computer 200, then the distribution rule is not executed or the data transfer is not completed. The initiating computer 200 authenticates the receiving computer 210 in the same manner. If the initiating computer 200 is not able to authenticate the receiving computer 210, then the data transfer is not completed.

If the initiating computer 200 is properly authenticated by the receiving computer 210, then the receiving computer 210 determines what actions are authorized for that initiating computer using an authorization table 211 associated with computer 210. The authorization table 211 may be part of the computer 210 or may be another trusted computer on a network accessible by computer 210. Preferably, the authorization table is accompanied by a digital signature computed on the authorization table by the distribution agent 210a of the receiving computer 210. If the authorization table is not properly signed, then the distribution rule is not executed or data transfer is not completed. In this manner, the distribution agent 210a maintains the security of the authorization table.

The authorization table 211 includes three parts 212, 213, 214 for mapping local user identifiers to authenticated remote computers. The first part 212 identifies a remote computer; the second part 213 identifies a corresponding local user; and the third part 214 provides qualifiers for operation of the system. When an initiating computer 200 establishes a communication link with the receiving computer 210, it requests authorization to act as a particular local user. The distribution agent 210a consults the authorization table 211 to determine whether the initiating computer is associated with the requested local user in the table. If the initiating computer is not associated with the requested local user, then the communication link is terminated and no actions are performed.

If the initiating computer is associated with the requested local user, then the communication link is maintained and the distribution agent on the receiving computer checks the qualifiers 214 to determine whether the initiating computer, when acting as the requested local user, has authority to perform those actions. For example, the qualifier 214 may indicate whether the initiating computer can send a distribution rule for execution. Furthermore, the qualifier 214 may indicate whether the initiating computer may look at or change the values in the authorization table. When any of the actions which relate to the qualifiers are to be performed as part of establishing a communication link or executing a distribution rule, the distribution agent checks authorization as set by the qualifiers in the authorization table for the initiating computer and local user. Any actions which are not authorized by the qualifiers are not performed. Of course, the operating system on the receiving computer may further limit the actions which can be performed. Specifically, the operating system verifies the authority of the local user to perform certain actions, such as accessing, copying or storing certain data. Therefore, the selection of a specific local user associated with a initiating computer in the authorization table will further provide security for the system.

The same process may be used in the other direction. Computer 210 has an authorization table 211 that is used to determine if an outbound connection to computer 200 is authorized for a given local user identifier on computer 210. Computer 210 sends a keyed certificate identifying itself to computer 200. Computer 200 has an authorization table 201 mapping remote computers to authorized local users and corresponding qualifiers. Computer 210 also sends a local user designation. If computer 210 is authorized to act as the designated local user within the authorization table 201, then the communication link from computer 210 to computer 200 is established. As computer 210 seeks to perform actions as a local user on computer 200, the distribution agent 200*a* checks the qualifications 204 in the authorization table 201, as necessary, to verify that the requested action is allowed before it is executed.

The security process of the present invention will now be described with respect to a basic data transfer process. The basic data transfer process is the transfer of a file resident on a source computer to a recipient computer. The central management computer establishes a communication link with a source computer for transfer of a distribution rule. As part of establishing the communication link, the central management computer transfers a keyed certificate for authentication. The central management computer further requests authority to act as a specified local user. If the central management computer is authorized to act as the specified local user on the source computer, and that entry includes qualifications for allowing connection by and distribution rules from the central management computer, then processing of the distribution rule commences. As part of the distribution rule, the source computer is to establish a communication link with the recipient computer. The distribution agent verifies in the qualifications that the source computer, acting as the specified local user, may establish a communication link with the recipient computer. As part of establishing the communication link, the source computer transmits a keyed certificate and distribution rules including a second local user designation. The recipient computer authenticates the source computer and checks its authorization table to verify that the source computer may function as the specified second local user. The recipient computer further verifies in the qualifications of its authorization table that the source computer is authorized to establish a connection. If the source computer is properly authorized, the recipient computer receives the distribution rule, which indicates that the recipient computer is to receive and store the file. The file is then transferred from the source computer to the recipient computer. Of course, if the local user at the source computer does not have authority, as determined by the operating system, to access the file, or the local user at the recipient computer does not have authority, as determined by its operating system, to store the file, then the transfer will not be completed.

The invention may be embodied in other specific forms without departing from the spirit or essential characteristics thereof. The present embodiments are therefore to be considered in respects as illustrative and not restrictive, the scope of the invention being indicated by the appended claims rather than by the foregoing description, and all changes which come within the meaning and range of the equivalency of the claims are therefore intended to be embraced therein.

What is claimed is:

1. An apparatus for implementing security procedures during a data transfer process comprising:
   means for transferring data from an initiating computer to a remote computer;
   an authorization table associated with the initiating computer including at least:
   i) a remote computer identifier;
   ii) at least one local user identifier corresponding to the remote computer identifier; and
   iii) qualifiers authorizing operations;
   means for the initiating computer, acting as a local user, to request to establish a communication link to connect to the remote computer, to perform desired operations;
   means for determining from at least the authorization table whether the remote computer is associated with the local user;
   means for denying the request if the remote computer is determined not to be associated with the local user; and
   means for permitting the request if the remote computer is determined to be associated with the local user.

2. The apparatus for implementing security procedures during a data transfer process according to claim 1, further comprising:
   means for receiving a keyed certificate at the remote computer from the initiating computer for establishing a secure communication link between the initiating computer and the receiving computer; and
   means for processing the keyed certificate to verify the initiating computer at the remote computer.

3. The apparatus for implementing security procedures during a data transfer process according to claim 1, wherein the desired operation is transfer of data from the initiating computer.

4. The apparatus for implementing security procedures during a data transfer process according to claim 1, wherein the desired operation is reception of data at the remote computer.

5. The apparatus for implementing security procedures during a data transfer process according to claim 1, further comprising
   means for transmitting a request for authorization to operate as the local user from the initiating computer;
   means for determining, in association with the remote computer, whether the initiating computer is associated with the local user;
   means for terminating the communication link if the initiating computer is determined not to be associated with the local user; and
   means for maintaining the communications link and authorizing the initiating computer to perform certain operations at the remote computer if the initiating computer is determined to be associated with the local user, then.

6. The apparatus for implementing security procedures during a data transfer process according to claim 1, wherein the means for transferring data from an initiating computer to a remote computer is based on a schedule or occurrence of an event.

7. The apparatus for implementing security procedures during a data transfer process according to claim 1, wherein the authorized operation allows the initiating computer to send a distribution rule which includes a set of steps for execution on the remote computer in order to complete a data transfer.

8. The apparatus for implementing security procedures during a data transfer process according to claim 1, further including a means for determining, at least from the qualifiers in the authorization table whether the desired operation is authorized;
means for authorizing the desired operation if the qualifier authorizes the operation;
means for denying the desired operation if the qualifier does not authorize the operation.

9. The apparatus for implementing security procedures during a data transfer process according to claim 1, wherein the steps for execution on the remote computer are chosen from a group comprising at least the following: retrieval from a source computer; encryption and decryption of data, formatting of data, conversion of data to a different format firewall traversal process, and storage of data.

10. A method for implementing security procedures during a data transfer process comprising the steps of:
receiving, over a communications link to a receiving computer, a request from a remote computer for authorization to perform desired operations at the receiving computer under a particular local user identifier;
maintaining, in association with the receiving computer, an authorization table including at least a remote computer identifier and a corresponding local user identifier and qualifiers authorizing operations;
determining whether the remote computer is associated with the requested local user using the authorization table;
terminating the communications link if the requested local user is not associated with the corresponding local user identifier; and
maintaining the communications link for the desired operations, if the requested local user is associated with the corresponding local user identifier.

11. The method for implementing security procedures during a data transfer process according to claim 10, wherein the authorized operation includes transferring data.

12. The method for implementing security procedures during a data transfer process according to claim 10, wherein the authorized operation includes allowing the remote computer to modify the authorization table.

13. The method for implementing security procedures during a data transfer process according to claim 10, wherein the authorized operation includes receiving data.

14. The method implementing security procedures during a data transfer process according to claim 10, further comprising the step of receiving a keyed certificate from the remote computer; and
wherein the authorization of the remote computer is based on the keyed certificate.

15. The method for implementing security procedures during a data transfer process according to claim 10, wherein the desired operation is transferring of a distribution rule and the authorized operation allows the remote computer to transfer the distribution rule.

16. The method for implementing security procedures during a data transfer process according to claim 15, wherein the steps for execution on the receiving computer includes enabling at least one or more of the following steps: retrieval from a source computer; encryption and decryption of data, formatting of data, conversion of data to a different format, firewall traversal process, and storage of data.

17. The method implementing security procedures during in a data transfer process according to claim 10, further comprising the steps of:
authorizing the desired operation if the qualifier authorizes the operation;
denying the desired operation if the qualifier does not authorize the operation.

18. The method implementing security procedures during in a data transfer process according to claim 10, further comprising the steps of:
determining, before establishing a communications link to the receiving computer, whether the receiving computer is associated with the requested local user;
if the receiving computer is not associated with the requested local user, then denying authorization to establish a communications link to the receiving computer; and
if the receiving computer is associated with the requested local user, then authorizing a communications link to the receiving computer to transfer data.

19. A system for implementing security procedures during a data transfer process within a computer network which includes at least a central management computer for sending a distribution rule to a distribution agent of a primary computer for use in controlled data transfer between the primary computer distribution agent and a distribution agent of a secondary computer, the system further comprising:
means for requesting authentication for the primary computer, acting as a local user to connect to the secondary computer;
an authorization table associated with the primary computer including at least:
i) a secondary computer identifier;
ii) at least one local user identifier corresponding to the secondary computer identifier; and
iii) qualifiers authorizing operations;
means for the primary computer, acting as a local user to request to establish a communication link to connect to the secondary computer, to perform desired operations;
means for determining from at least the authorization table whether the secondary computer is associated with the local user;
means for denying the request if the secondary computer is determined not to be associated with the local user; and
means for permitting the request if the secondary computer is determined to be associated with the local user.

20. The system of claim 19, further comprising:
means for transmitting a keyed certificate from the primary computer;
means for transmitting a request for authorization to operate as the local user from the primary computer;
means for determining, by the secondary computer distribution agent, whether the primary computer is associated with the local user;
if the primary computer is not associated with the local user, then terminating the communications link; and
if the primary computer is associated with the local user, then the communications link is maintained and the data transfer is executed in accordance with the distribution rule.

21. The system of claim 19, wherein the data transfer is in order to transfer distribution rules to one or more secondary computers from a primary computer.

22. The system of claim 19, wherein the data transfer is in order to transfer distribution rules from a secondary computer to a third computer.

23. The system of claim 19, wherein the authentication table is accompanied by a digital signature computed on the authorization table by the primary computer distribution agent.

24. The system of claim 19, wherein the data transfer process is a fan out process, replication process, multiple copy replication process, synchronization process, or aggregation process.

* * * * *